(12) United States Patent
Fahimi et al.

(10) Patent No.: US 9,239,746 B2
(45) Date of Patent: Jan. 19, 2016

(54) METHOD OF, AND APPARATUS FOR, DETECTION OF DEGRADATION ON A STORAGE RESOURCE

(71) Applicant: Xyratex Technology Limited, Havant (GB)

(72) Inventors: Farshad Fahimi, Havant (GB); Mohsen Mesgarpour, Havant (GB); Chris Bloxham, Havant (GB)

(73) Assignee: XYRATEX TECHNOLOGY LIMITED—A SEAGATE COMPANY, Havant (GB)

( * ) Notice: Subject to any disclaimer, the term of this patent is extended or adjusted under 35 U.S.C. 154(b) by 161 days.

(21) Appl. No.: 13/906,195

(22) Filed: May 30, 2013

(65) Prior Publication Data
US 2014/0359376 A1 Dec. 4, 2014

(51) Int. Cl.
*G06F 11/00* (2006.01)
*G06F 11/07* (2006.01)
*G06F 11/34* (2006.01)

(52) U.S. Cl.
CPC ........ *G06F 11/0751* (2013.01); *G06F 11/3409* (2013.01); *G06F 11/34* (2013.01); *G06F 11/3452* (2013.01)

(58) Field of Classification Search
CPC ............ G06F 11/0751; G06F 11/0793; G06F 11/0709; G06F 11/0772; G06F 11/0781; G06F 11/0727; G11B 2220/20; G11B 20/1883
USPC ...................................................... 714/42, 48
See application file for complete search history.

(56) References Cited

U.S. PATENT DOCUMENTS

| 5,917,724 | A | 6/1999 | Brousseau et al. |
| 6,408,406 | B1 | 6/2002 | Parris |
| 7,035,971 | B1 * | 4/2006 | Merchant ...................... 711/114 |
| 7,406,631 | B2 | 7/2008 | Moore |
| 7,475,279 | B2 | 1/2009 | Takahashi et al. |
| 7,565,262 | B2 | 7/2009 | Yuan et al. |
| 7,707,461 | B2 | 4/2010 | Dougherty et al. |

(Continued)

FOREIGN PATENT DOCUMENTS

| CN | 1719785 | 1/2006 |
| WO | 2013/023030 | 2/2013 |

OTHER PUBLICATIONS

United Kingdom Search and Examination Report dated Nov. 27, 2013 in corresponding Great Britain Patent Application No. GB1309705.0.

*Primary Examiner* — Yair Leibovich
(74) *Attorney, Agent, or Firm* — Hollingsworth Davis, LLC (57) ABSTRACT

A method of monitoring the performance of a device is presented, each storage device being operable to receive storage requests and includes a queue for incoming storage requests and a physical storage medium, the method includes: a) obtaining data relating to the device parameters of: throughput of storage requests to the storage device; queue time for one or more requests on the storage device; and the time required to complete one or more storage requests on the storage device; b) generating a model relating to the expected distribution of the device parameters on the storage device during normal operation; c) monitoring the parameters during operation of the storage device; d) comparing the distribution of the monitored parameters during operation of the storage device with the expected distribution of the parameters; and e) identifying a fault on the storage device based on the comparison.

24 Claims, 5 Drawing Sheets

(56) References Cited

U.S. PATENT DOCUMENTS

| | | |
|---|---|---|
| 7,721,061 B1 | 5/2010 | Kelly et al. |
| 2003/0014464 A1* | 1/2003 | Deverill et al. ............... 709/101 |
| 2003/0065986 A1* | 4/2003 | Fraenkel et al. ................ 714/47 |
| 2003/0208614 A1* | 11/2003 | Wilkes ......................... 709/232 |
| 2004/0025162 A1 | 2/2004 | Fisk |
| 2006/0074970 A1 | 4/2006 | Narayanan et al. |
| 2006/0161648 A1 | 7/2006 | Ding et al. |
| 2008/0189578 A1 | 8/2008 | Raghuraman et al. |
| 2008/0267065 A1 | 10/2008 | Balakrishnan et al. |
| 2010/0165812 A1* | 7/2010 | Howard et al. ............ 369/53.21 |
| 2011/0051582 A1 | 3/2011 | Feliss et al. |
| 2011/0239054 A1 | 9/2011 | Mamata |
| 2012/0005533 A1 | 1/2012 | Li et al. |
| 2014/0089735 A1* | 3/2014 | Barrett et al. ................... 714/27 |

\* cited by examiner

METHOD OF, AND APPARATUS FOR, DETECTION OF DEGRADATION ON A STORAGE RESOURCE

The present invention relates to a method of, and apparatus for, detection of hard drive-related degradation on a storage system. More particularly, the present invention relates to a method of, and apparatus for, non-intrusive detection of hard drive-related degradation on a parallel I/O-based storage system.

A typical storage system generally comprises a server and a plurality of hard disk drives connected together over a network to one or more servers, each of which provides a network-addressable storage resource. Alternatively, the storage system may comprise a local configuration where the storage resource is connected directly to a terminal or server or may form a local storage arrangement such as a hard disk drive in a laptop or personal computer.

Certain storage systems are particularly optimised for access performance. Such systems may, for example, write data to multiple drives or multiple arrays in parallel.

A class of storage system known as high performance computing (HPC) systems comprise a plurality of HPC clusters of one or more servers. These servers comprise one or more servers (which may be embedded) and one or more arrays of storage devices (such as hard drives). The performance of HPC systems is generally a function of the number of servers and/or storage devices which are operable in parallel, together with network connections and file systems.

It is necessary to monitor properties of such systems in order to detect degradation, failures and errors in the system. In the context of HPC systems, such degradation may be related to hardware errors such as hard drive corruptions and failures, or CPU errors due to, for example, overheating. Therefore, it is common to request such monitoring data from the hardware, this data then being stored in a monitored log. Hardware failure can then be logged and detected.

One common example of this is the SMART (Self Monitoring, Analysis and Reporting technology). The SMART diagnostic element provides a SMART status comprising two values: "threshold not exceeded" and "threshold exceeded". Often these are represented as "drive OK" or "drive fail". The failure may be catastrophic or may relate to a more minor error such as a bad sector or a write fail.

In addition, SMART diagnostics comprise further detail in the form of SMART attributes. This may vary from hard drive to hard drive but may comprise a log containing further information as to the drive status; for example: read/write status; spin up time; start/stop count; seek time performance; seek error rate; command timeout; drive life protection status; or spin retry count.

However, obtaining SMART data can reduce the performance of HPC systems. Performing SMART diagnostics on a hard drive can reduce the instantaneous read/write speed of the drive in question. For example, SMART data from an enclosure of 84 drives with an average of 40 signals will result to a total of 3360 signals. A 5 second internal sampling rate will result to 40320 data points per minute to be transferred, collected and analysed. Since read/write access speed and data streaming performance is paramount for HPC systems, this additional load on is the system is inconvenient, unwanted and detrimental.

Therefore, a technical problem in the art is that it is difficult, using known methods, to predict and detect reduced performance of hard drives in a non-intrusive manner.

According to a first aspect of the present invention, there is provided a method of monitoring the performance of one or more storage devices, the or each storage device being operable to receive storage requests and comprising a queue for incoming storage requests and a physical storage medium, the method comprising: a) obtaining, on a computing device, data relating to the device parameters of: throughput of storage requests to the or each storage device; queue time for one or more requests on the or each storage device; and the time required to complete one or more storage requests on the or each storage device; b) generating, on a computing device, a model relating to the expected distribution of said device parameters on the or each storage device during normal operation; c) monitoring, on a computing device, said parameters during operation of the or each storage device; d) comparing, on a computing device, the distribution of said monitored parameters during operation of the or each storage device with the expected distribution of said parameters; and e) identifying, on a computing device, a fault on the or each storage device based on said comparison.

The method according to the present invention has numerous benefits over known systems. Firstly, the techniques are non-intrusive. The system and drives can be monitored passively without impact on performance. The present invention enables the drives to be compared with each other over time. No additional data patterns need to be created and written to the drives for monitoring purposes. In contrast, known methods require a known I/O set to be run on a given drive to characterise the drive. This places a time and resource burden on the hardware.

Secondly, the techniques used for modelling and data collection are light in terms of processing and memory usage. Therefore, no significant load is placed on the system during analysis.

Thirdly, the method is sensitive to degradations in performance even when SMART (Self-Monitoring, Analysis and Reporting Technology) data such as corrected and uncorrected errors and grown defect are not showing any sign of failure or degradation.

Finally, in contrast to known techniques, the point of degradation can be identified, i.e. before the slow drive has an impact on the data throughput.

In general, such monitoring as set out above is a challenging task, because even homogeneous hardware show slightly different performance characteristics.

In one embodiment, a plurality of storage devices is provided in parallel.

In one embodiment, each storage device forms part of a RAID array.

In one embodiment, step d) further comprises: comparing the expected distributions for each of the storage devices with the monitored distribution of said parameters for each of the storage devices.

In one embodiment, step d) further comprises: comparing the distribution of said monitored parameters for one storage device with the distribution of said monitored parameters for at least one other storage device.

In one embodiment, step b) further comprises: determining the expected correlation between the device parameters for the or each storage device.

In one embodiment, step d) further comprises: comparing the expected correlation between the device parameters for the or each storage device with the correlation between the monitored parameters for the or each storage device.

In one embodiment, said correlation is determined using Bayesian probability analysis.

In one embodiment, the model is generated using a Poisson distribution of said device parameters.

In one embodiment, step d) further comprises: comparing the Poisson distribution of said monitored parameters during operation of the or each storage device with the expected Poisson distribution of said device parameters.

In one embodiment, step d) further comprises: determining the Skellam distribution for said expected and monitored parameters.

In one embodiment, step e) further comprises: identifying a fault with the or each storage device based on said Skellam distribution.

According to a second aspect of the present invention, there is provided computing apparatus operable to monitor the performance of one or more storage devices, the or each storage device being operable to receive storage requests and comprising a queue for incoming storage requests and a physical storage medium, the controller being operable to: obtain data relating to the device parameters of: throughput of storage requests to the or each storage device; queue time for one or more requests on the or each storage device; and the time required to complete one or more storage requests on the or each storage device; to generate a model relating to the expected distribution of said device parameters on the or each storage device during normal operation; to monitor said parameters during operation of the or each storage device; to compare the distribution of said monitored parameters during operation of the or each storage device with the expected distribution of said parameters; and to identify a fault on the or each storage device based on said comparison.

In one embodiment, a plurality of storage devices is provided in parallel.

In one embodiment, each storage device forms part of a RAID array.

In one embodiment, the computing apparatus is further operable to compare the expected distributions for each of the storage devices with the monitored distribution of said parameters for each of the storage devices.

In one embodiment, the computing apparatus is further operable to compare the distribution of said monitored parameters for one storage device with the distribution of said monitored parameters for at least one other storage device.

In one embodiment, the computing apparatus is further operable to determine the expected correlation between the device parameters for the or each storage device.

In one embodiment, the computing apparatus is further operable to compare the expected correlation between the device parameters for the or each storage device with the correlation between the monitored parameters for the or each storage device.

In one embodiment, said correlation is determined using Bayesian probability analysis.

In one embodiment, the model is generated using a Poisson distribution of said device parameters.

In one embodiment, the computing apparatus is further operable to compare the Poisson distribution of said monitored parameters during operation of the or each storage device with the expected Poisson distribution of said device parameters.

In one embodiment, the computing apparatus is further operable to determine the Skellam distribution for said expected and monitored parameters.

In one embodiment, the computing apparatus is further operable to identify a fault with the or each storage device based on said Skellam distribution.

According to a third aspect of the invention, there is provided at least one data storage resource and the computing apparatus of the second aspect.

According to a fourth aspect of the present invention, there is provided a computer program product executable by a programmable processing apparatus, comprising one or more software portions for performing the steps of the first aspect.

According to a fifth aspect of the present invention, there is provided a computer usable storage medium having a computer program product according to the fourth aspect stored thereon.

Figure 1:
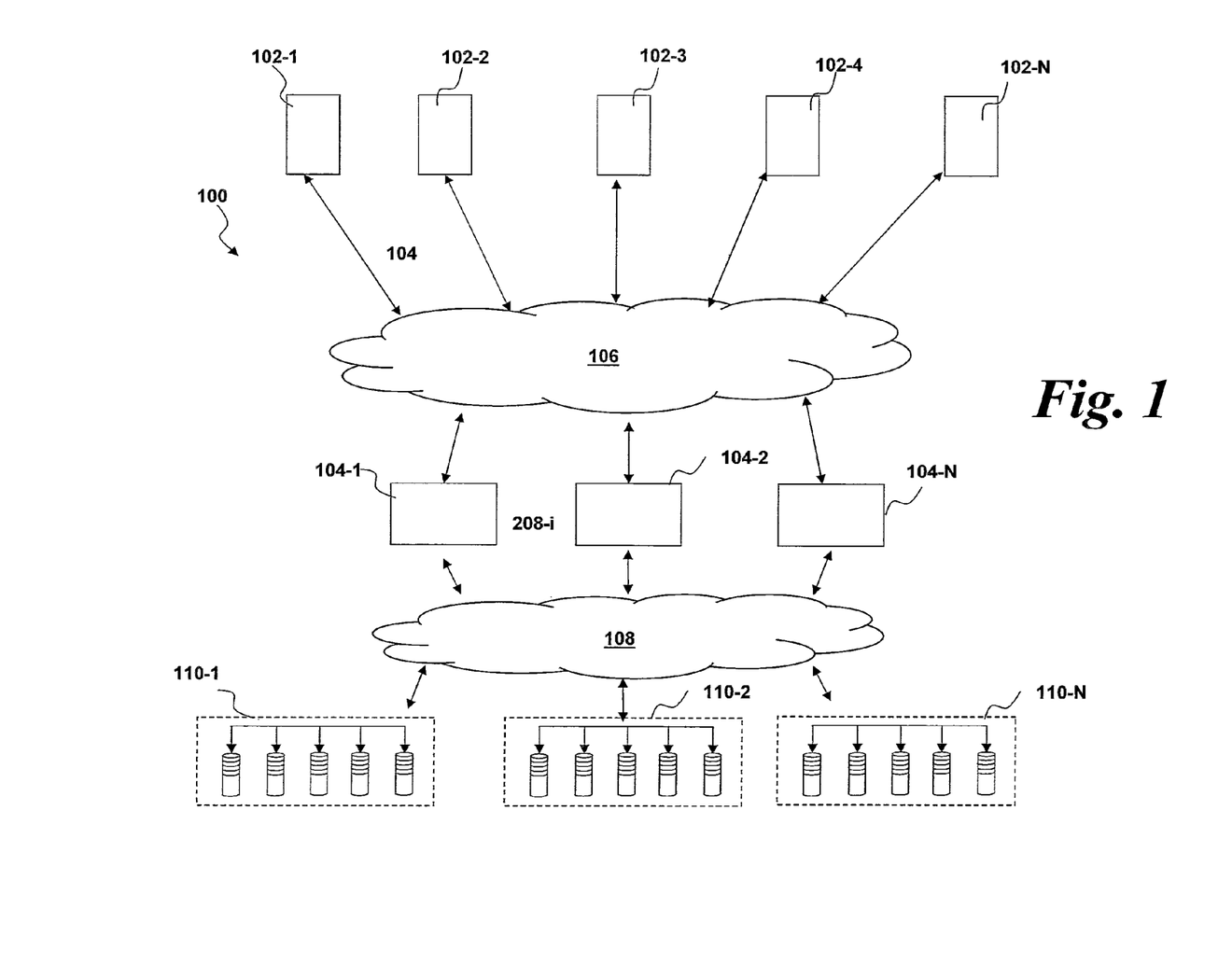
FIG. 1 is a schematic diagram of a networked storage system according to an embodiment of the present invention.

Embodiments of the present invention will now be described in detail with reference to the accompanying drawings, in which:

FIG. 1 shows a schematic illustration of a networked storage resource 100 in which the present invention may be used. However, it is to be appreciated that a networked storage resource is only one possible implementation of a storage resource which may be used with the present invention.

The networked storage resource 100 comprises a cluster file system. A cluster file system consists of client 102-1 to 102-N and server 104-1 to 104-N nodes, connected by a network 106. Client applications, running on client nodes, make storage requests (which may comprise file storage requests) against the cluster file system. Some of these calls result in updates to the file system state, recorded in volatile and persistent stores of node.

A commonly used distributed cluster file system is Lustre™. Lustre is a parallel distributed file system, generally used for large scale cluster computing. Lustre file systems are scalable and are able to support many thousands of clients and multiple servers.

The networked storage resource comprises a plurality of hosts 102. The hosts 102 are representative of any computer systems or terminals that are operable to communicate over a network. Any number of hosts 102 or servers 104 may be provided; N hosts 102 and N servers 104 are shown in FIG. 1, where N is an integer value.

The hosts 102 are connected to a first communication network 106 which couples the hosts 102 to a plurality of servers 104. The communication network 106 may take any suitable form, and may comprise any form of electronic network that uses a communication protocol; for example, a local network such as a LAN or Ethernet, or any other suitable network such as a mobile network or the internet.

The servers 104 are connected through device ports (not shown) to a second communication network 108, which is also connected to a plurality of storage devices 110-1 to 110-N. The second communication network 108 may comprise any suitable type of storage controller network which is able to connect the servers 104 to the storage devices 20. The second communication network 108 may take the form of, for example, a SCSI network, an iSCSI network or fibre channel.

The servers 104 may comprise any storage controller devices that process commands from the hosts 102 and, based on those commands, control the storage devices 110. The storage devices 110 may take any suitable form; for example, tape drives, disk drives, non-volatile memory, or solid state devices.

Although most RAID architectures use hard disk drives as the main storage devices, it will be clear to the person skilled in the art that the embodiments described herein apply to any type of suitable storage device. More than one drive may form a storage device 110; for example, a RAID array of drives may form a single storage device 110. The skilled person will be readily aware that the above features of the present embodiment could be implemented in a variety of suitable configurations and arrangements.

Additionally, each storage device 110 comprising a RAID array of devices appears to the hosts 102 as a single logical storage unit (LSU) or drive. Any number of storage devices 110 may be provided; in FIG. 1, N storage devices 110 are shown, where N is any integer value.

The operation of the servers 104 may be set at the Application Programming Interface (API) level. Typically, Original Equipment Manufactures (OEMs) provide RAID networks to end clients for network storage. OEMs generally customise a RAID network and tune the network performance through an API.

The servers 104 and storage devices 110 also provide data redundancy. The storage devices 110 comprise RAID controllers which provide data integrity through a built-in redundancy which includes data mirroring. The storage devices 110 are arranged such that, should one of the drives in a group forming a RAID array fail or become corrupted, the missing data can be recreated from the data on the other drives.

Figure 2:
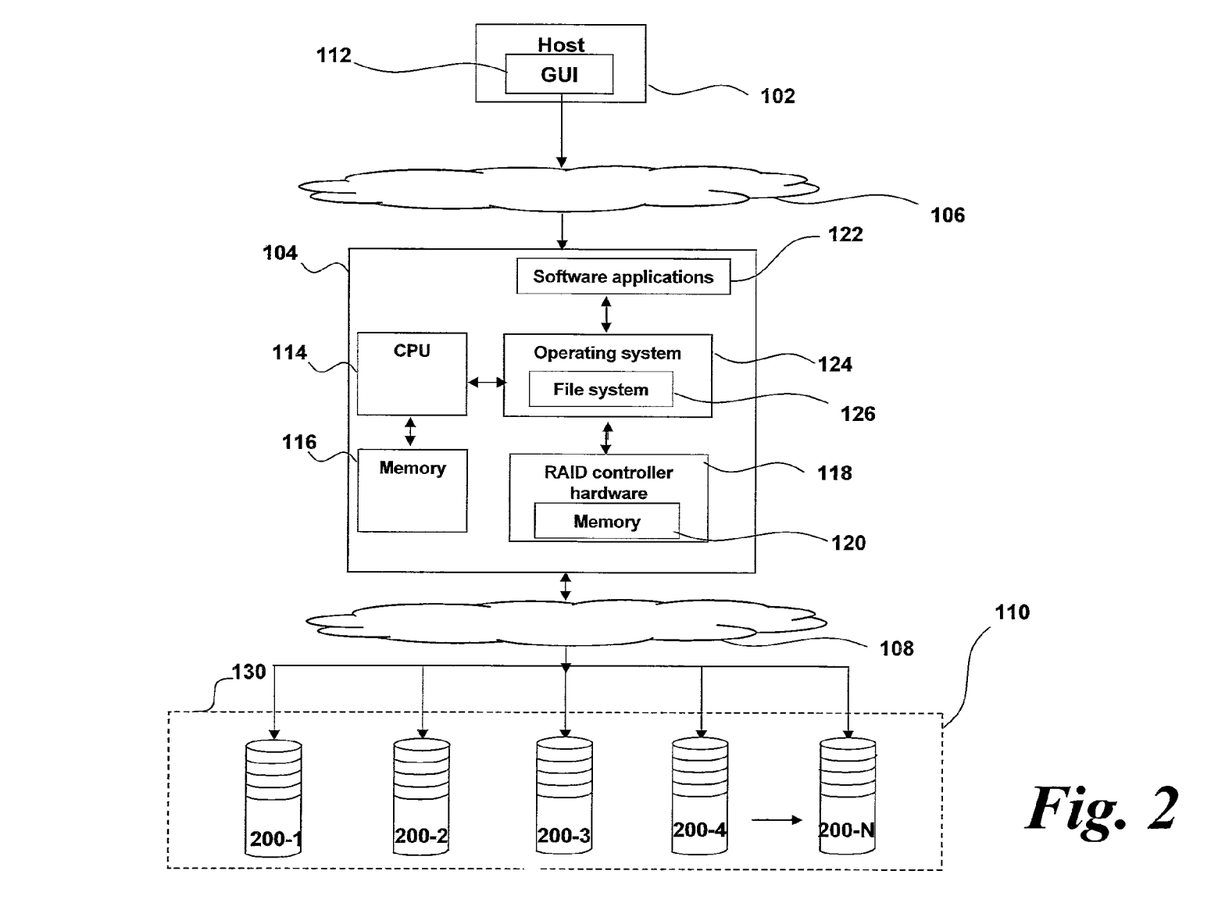
FIG. 2 is a more detailed schematic diagram showing a single server and RAID array of an embodiment.

FIG. 2 shows a more detailed schematic diagram of a single host 102 and single server 104 which may form the whole or part of the storage resource 100.

The host 102 comprises a general purpose computer (PC) which is operated by a client and which has access to the storage resource 100. A graphical user interface (GUI) 112 is run on the host 102. The GUI 112 is a software application which acts as a user interface for a client of to the host 102.

The server 104 comprises hardware components including a CPU 114 having a local memory 116, and, in this embodiment, RAID controller hardware 118. The RAID controller hardware 118 comprises a memory 120. It is, however, to be understood that the RAID controller may be provided in software, or omitted entirely.

The software components of the server 104 comprise a software application layer 122 and an operating system 124. The software application layer 122 comprises software applications including the algorithms and logic necessary for the initialisation and run-time operation of the server 104. The software application layer 122 includes software functional blocks such as a system manager for fault management, task scheduling and power management. The software application layer 122 also receives commands from the host 102 (e.g., assigning new volumes, read/write commands) and executes those commands.

The operating system 124 utilises an industry-standard software platform such as, for example, Linux, upon which the software applications forming part of the software application layer 122 can run. In one mode of operation, the operating system 124 comprises a file system 126 which enables the RAID controller 104 to store and transfer files and interprets the data stored on the primary and secondary drives into, for example, files and directories for use by the operating system 124. Alternatively, when the server 104 is used in parallel with a multiplicity of other servers 104, each server may provide a portion of the data which is then assembled by the host 102.

The RAID controller hardware 118 is the physical processor platform of the RAID controller 104 that executes the software applications in the software application layer 116. The RAID controller hardware 118 comprises a microprocessor, memory 122, and all other electronic devices necessary for RAID control of the storage devices 110. However, the controller hardware need not be in the form of RAID hardware and other storage architectures may be utilised and controlled by the controller and fall within the scope of the present invention.

Whilst, in FIG. 2, the RAID controller hardware 118 is shown as part of the server 104, this need not be so. The skilled person would be readily aware of alternatives which fall within the scope of the present invention; for example, the RAID controller hardware 118 may be remote from the server 104. In addition, the RAID controller hardware 118 may be located together with the storage devices 110 or remotely therefrom.

The server 104 is operable to receive storage requests (which may comprise I/O requests) to a file system 126 from hosts or clients 102 and process said storage requests to the file system 126. The file system 126 may comprise any suitable system and may be run on the server 104 to provide access to the storage devices 110. Non-exhaustive examples of suitable file systems may be: NTFS, HFS, ext3, ext4 or idiskfs.

The storage device 110 comprises, in this embodiment, a RAID array of hard drives 200-1-N. The hard drives 200-1-N may be connected in any suitable RAID array, for example, RAID-5 or RAID-6. Furthermore, whilst, for clarity, only 5 drives are shown in FIG. 2, it is to be understood that other numbers of drives may be used as required, i.e. N may be any suitable number.

The hard drives 200-1-N forming part of the storage device are located within a storage enclosure 130. The storage enclosure 130 may comprise a suitable rack or container to secure the hard drives 200-1-N within.

Embodiments of the present invention provide a method of obtaining information relating to faults occurring on one or more hard drives 200 by measuring parameters which have a low performance impact on the system as a whole.

The present invention relates to an analysis of I/O workload for performance analysis of hard drive arrays. This is done in order to detect degradation or failure states using I/O timing on a set of drives. The drives may or may not be homogeneous. The present invention relates to modelling the individual drive data arrival timing as well as the expected correlation between drives in individual RAID set. This approach has several advantages. By concentrating the modelling on a single drive a model can be built which is more straightforward to expand using additional parameters. The model uses self-correlation as well as correlation between characteristic similarities of drives in a RAID set to spot the degradation or slowness in specific drives.

Figure 3:
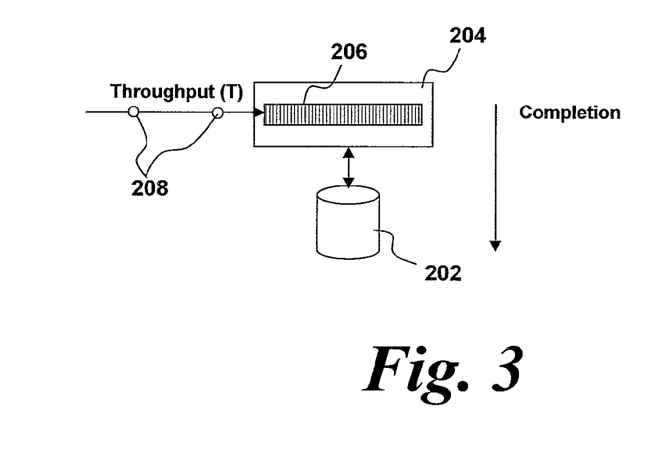
FIG. 3 is a schematic illustration of a hard drive as modelled in the present invention.

Consider first a single hard drive 200 as shown in FIG. 3. The hard drive 200 comprises a physical drive 202 and a firmware controller 204 comprising a memory including a queue 206.

The physical drive 202 comprises the hardware elements of a hard disk drive, such as the platter, head, control mechanisms and casing. These are well known and will not be described further here. The firmware controller 204 is operable to manage the queue 206 of I/O operations and to queue and reorder arriving I/O read/write requests as appropriate for execution by the physical drive 202.

In use, incoming I/O requests 208 arrive at the hard drive 200 at a rate defined by the throughput (T). These requests are then ordered and queued for execution in the queue 206 before being passed to the physical drive 202 for execution and completion of the read/write request.

In order to analyse the behaviour of the hard drive 200, three basic parameters can be defined and obtained from the hard drive 200 and associated driver hardware:

1) $t_q$—the average time an I/O request 208 spends in the queue 206 (also known as residence time);
2) $t_c$—service or completion time to complete the read/write request after queuing; and
3) T—the arrival rate of throughput onto the drive 200.

Note that the averages as set out above correspond, in an embodiment, to the average time for a recent time frame in the same operational mode. In a constant throughput situation (sampled over a small time frame), the throughput T of data flow is sufficient to provide a sufficient number of blocks to the hard drive 200 to keep the operations queue 206 at least partially filled. In other words, there is sufficient incoming I/O requests 208 to ensure that at least one request remains in the operations queue 206 at any time. This ensures that the drive 200 is running at its optimum operating mode with reduced power consumption, because the drive is kept constantly on and less time is spent spinning-up/spinning-down.

The firmware 204 has responsibility of reordering the queued I/O requests 208 in order to improve the performance of the drive. The resulting performance depends on a number of parameters—the degree of fragmentation of the drive is, the model, the block size used and the time frame over which I/O analysis is performed.

The inventors of the present invention have realised, for the first time, that the combination of throughput (T), queue time $t_q$ and completion time $t_c$ form a correlation for internal operations on an individual healthy drive 200.

In other words, a consistent correlation exists in a "healthy" drive (i.e. a substantially error-free drive or one subject to little or no degradation) between the arrival rate (T) of I/O requests 208, the rate of data in average escaping a specific queue length ($\lambda_q$) and the rate of data being read/written to the drive ($\lambda_c$). This approach has the advantage that it is independent from external I/O performance parameters of the system (for example, the number of path from Host Bus Adapters (HBAs) to the hard drives).

Figure 4:
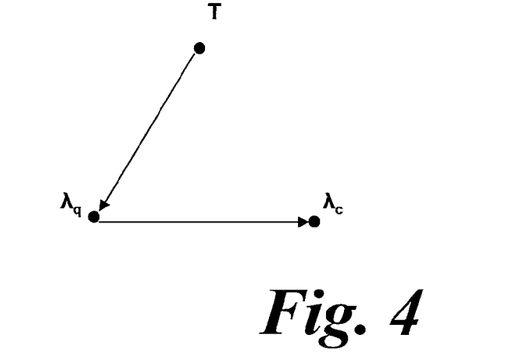
FIG. 4 is a Baysian correlation map showing the relationship between the drive parameters.

A probabilistic analysis of these three parameters can be performed to identify this correlation. In one embodiment, this analysis is performed using a Bayesian Network model. FIG. 4 shows a schematic of this correlation in a Bayesian model.

Bayesian probability involves the use of hierarchical models and marginalisation over the values of related parameters to infer other properties of a system. In many cases, the determination of such computational relationships is intractable. However, good approximations can be obtained using, for example, Markov Chain Monte Carlo methods or by experimental or empirical verification.

Since no two drives are identical, it is preferred that this pattern is evaluated against the drive's own error-free behaviour, i.e. when the drive is in normal operation with substantially no errors or degradation. However, in many cases where limited historical data exists for an individual drive, a model of a similar drive can be employed for diagnosis or modelling purposes.

In order to model the above probabilistic network the following parameters need to be determined:

1) The distribution model of arrival rates (T, $\lambda_q$, $\lambda_c$; and
2) The correlation (joint distribution profile) for specific operational modes (e.g. distribution of I/O block sizes and read/write operations)

The second parameter relates to the incorporation of additional parameters into the model. These may include: the fragmentation; the distribution of block sizes; the burstiness of I/Os; the distribution of read/write operations; the file system; and the average number of open files. However, a more straightforward model with fewer parameters is generally preferred, particularly in situations where the observation space is not large, data collection is a bottleneck and transient behaviours of the system is of less importance.

Figure 5:
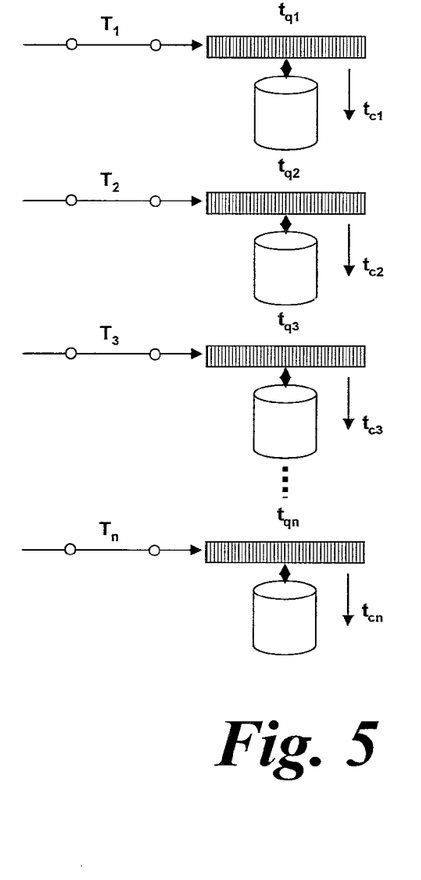
FIG. 5 is a schematic illustration of a RAID array comprising a plurality of hard drives as modelled in the present invention.

Once the model structure for a single drive 200 is formulated, this can be extended to cover a RAID drive array. FIG. 5 shows a schematic of an n-drive RAID arrangement 300. Each of the individual drives is, in this embodiment, substantially the same as the drive 200 illustrated previously, and comprises a physical drive and firmware including a operations queue.

In normal operation, most of the drives will maintain the queue length at a maximum for optimum operation. Therefore, queue length need not be considered initially. However queue time can be simply normalised to factor for this effect.

In general, disk I/O operations are categorised into two categories: random operations and sequential operations. A sequential I/O operation is typical in situations where large files are being read/written and involve sequential blocks being read/written one after the other. This is efficient for the drive because the head does not have to move significantly between blocks so that the seek time is relatively small.

However, random I/O operations involve a large number of seeks and rotations and therefore is much slower to carry out. Random I/O operations occur in situations where, for example, a hard drive is heavily fragmented, or where large numbers of small files are being written or read.

If direct information regarding the I/O pattern occurring at any one time is not available, whether random or sequential operations are taking place can be estimated based on block size observations. Normally, if block sizes are small (e.g. 16 KB or smaller) it can be assumed that I/O operations are predominantly random. However, if larger block sizes (e.g. 128 KB or larger) are being processed, then it can reasonably be assumed that this corresponds to sequential operation. After information regarding I/O patterns are collected, the probabilistic network is operable to infer the most probable mode from other parameters.

The above formulations hold true for individual drives in a RAID array. However, due to striping of data across drives (in, for example, RAID 5 or RAID 6 arrays), it is an important consideration for the drives to have similar hardware characteristics to within an acceptable tolerance level.

As the drives are being operated, degradation might and will cause the drives to fall out of their tolerance metrics. Subsequently, this will have detrimental effect on the whole RAID array. Detection of these cases is an aspect of the present invention.

To determine cases of slow or faulty drives, the following scheme is used. In this embodiment, for throughput modelling the arrival rate T of I/O requests is modelled to a Poisson distribution as set out in equation 1) below.

$$f(\lambda_T) = \frac{\lambda^k e^{-\lambda}}{k!} \qquad 1)$$

where λ is the mean throughput per unit time and k=0, 1, 2, 3 . . . .

Each parameter is then characterised based on the above description. $\lambda_q$ is, as set out above, the average queue rate and is inversely proportional to $t_q$. Therefore:

$$f(\lambda_q) = f(\lambda_T, q_I, \text{Blocksize}, \text{DriveModel}, \text{Merging}) \qquad 2)$$

Conversely, $\lambda_c$ is the average completion rate and is inversely proportional to $t_c$. Therefore:

$$f(\lambda_c) = f(\text{Blocksize}, \text{Rd/Wrt}, \text{Random/Sequential}, \text{Drive-Model}) \qquad 3)$$

In general, a parallel I/O drive arrangement such as, in one embodiment, a RAID array comprises a plurality of drives with similar hardware characteristics. In other words, the drives are homogeneous. In a substantially fault-free parallel I/O configuration in normal operation, the throughput (T) distribution is consistent across the whole array. This subsequently results in a correlated long-term trend with respect to $\lambda_q$, and $\lambda_c$. The functions below correspond to the Poisson Distribution Functions of the following rates:

$$f_{T_i} = f(\lambda_{T_i}) \qquad 4)$$

where $T_i$ is the throughput for drive i;

$$f_{q_i} = f(\lambda_{q_i}) \qquad 5)$$

where $q_i$ is the queue rate for drive i; and $$f_{c_i} = f(\lambda_{c_i}) \qquad 6)$$

where $c_i$ is the completion rate for drive i. Therefore, for a fault-free RAID array of drives:

$$f_{T_1} = f_{T_2} = f_{T_n}$$

$$f_{q_1} = f_{q_2} = f_{q_n}$$

$$f_{c_1} = f_{c_2} = f_{c_n} \qquad 7)$$

Note that $f_{q_i}$ and $f_{c_i}$ are not connected in the Bayesian network graph in FIG. 4. This shows that the internal trends for each drive are self-correlated and not compared to avoid false alarms and generalisations in the diagnosis of faults in the RAID array.

Failure of a Single Drive in a Parallel Drive Arrangement

Consider a failure scenario in which a drive in a parallel drive arrangement such as a RAID array is not performing similarly to others in the array. Given that, in a RAID 5 or RAID 6 array, the data is striped across the drives, this reduction will cause the throughputs across each the drives on the array to drop identically since the RAID array can only process the data at the rate of the slowest drive in the array.

As previously described, the Poisson distribution has been used to model the throughput arrival rate. The Skellam distribution is now used to model and quantify changes in these arrival rates. A Skellam distribution is the discrete probability distribution of the difference of two statistically independent random variables, each having Poisson distributions with different expected values. In a Skellam distribution, if $\mu_1$ and $\mu_2$ are expected rate and average current rate of arrival, changes are quantified in the following distribution as set out in equation 8):

$$f(k, \mu_1, \mu_2) = e^{-(\mu_1 + \mu_2)} \left(\frac{\mu_1}{\mu_2}\right)^{\frac{k}{2}} I(k)\left(2\sqrt{\mu_1 \mu_2}\right) \qquad 8)$$

where $t_0 \rightarrow \mu_1$ is the distribution of initial observation on a healthy set at a specific time frame and $t_n \rightarrow \mu_n$ is the distribution when a drop in throughput maximum occurs, this effect will be seen in the Skellam distribution as a negative shift in centroid.

Expressed algebraically, for a situation where a drive in a RAID array is slower than normal, the correlation between $t_q(\lambda_q)$ and $t_c(\lambda_c)$ is weakened. Therefore:

$$P(\lambda_{T_i}) \rightarrow E(f_T(k, \mu_1, \mu_2)) < 0 \qquad 9)$$

$$P_{t_n}(t_{q_i} | \lambda_{T_i}) \sim P_{t_0}(t_{q_i} | \lambda_{T_i}) \qquad 10)$$

$$P_{t_n}(t_{c_i} | \lambda_{q_i}) << P_{t_0}(t_{q_i} | \lambda_{T_i}) \qquad 11)$$

Further, if an individual drive is slower in a RAID set, other drives are not affected. In some cases, other drives can even show an improvement in performance due to caching. This makes identification of a fault using known techniques problematic. However, in the case of the present invention, the correlation between $t_c(\lambda_c)$ for the slow drive and $t_c(\lambda_c)$ for the other drives in the RAID array also becomes weaker, providing further indication of the slow drive.

Figure 6:
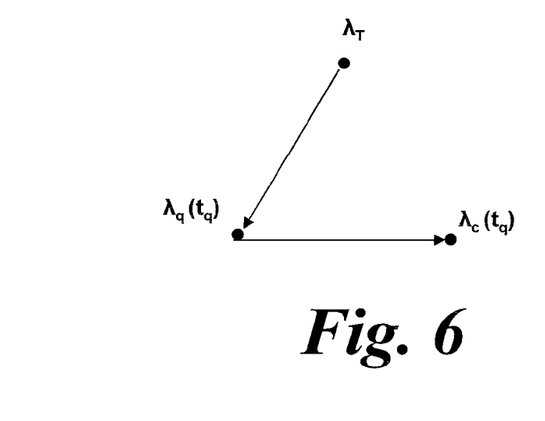
FIG. 6 is a further Baysian correlation map showing the relationship between the drive parameters.
Figure 7:
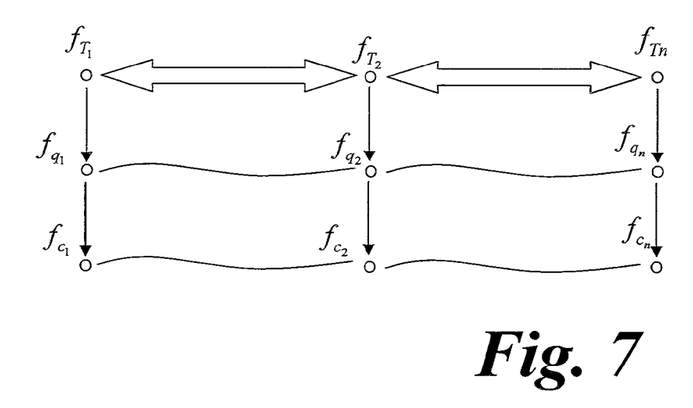
FIG. 7 is a correlation map showing the relationship between the drive parameters in a RAID array.
Figure 8:
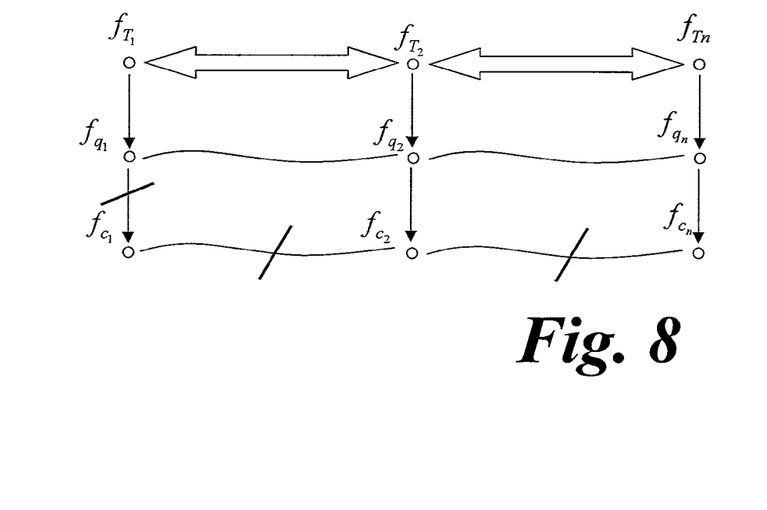
FIG. 8 is a correlation map similar to FIG. 7 but showing a breakdown in correlation resulting from an error on a drive.

In other words, a breakdown in correlation of the internal timing of the drives will indicate a failure. As shown in FIG. 6, the correlation between the queue rate and the completion rate for drive 1 has broken down. Further, there is no longer a correlation between the completion rate for drive 1 and drives 2 to n because the completion rate/time of the other drives in the array are unaffected (and in some cases, improved in performance due to caching). Therefore, it can be inferred that a problem has occurred on drive 1.

EXAMPLE

Network Hog Failure

A network hog failure corresponds to a rogue process on the monitored file servers which induces an unusually high workload for a specific resource, such as a drive.

A network hog failure will increase throughput at a specific drive in comparison to other drives. This will, eventually, result in a drop in the throughput across all drives. However, it initially will create a temporary asymmetry with respect to the throughput across the drives in an array which can be detected by the approach of the present invention.

In this case, the Skellam distribution for the specific drive suffering from the hog failure will have a positive shift in centroid in comparison to the Poisson distribution of the throughput arrival rate on other drives. If $\mu_1$ is the distribution of observation on a healthy set at a specific time frame and $\mu_n$ is the arrival rate on an affected drive with a hog failure, this effect will be seen in the Skellam distribution as a positive shift in centroid, as set out in expression 12) below:

$$P(\lambda_{T_1}, \lambda_{T_n}) \rightarrow E(f_T(k, \mu_1, \mu_2)) > 0 \qquad 12)$$

EXAMPLE

Busy Failures

A busy (or loss) fault is a fault which occurs due to an unmonitored (i.e. outside the scope of the server operating system) third party-created condition which induces a performance degradation for the specific drive or resource.

Busy failures, in general, result in an identical decrease in throughput on all servers. These types of failures are, therefore, more difficult to detect as throughput will be symmetric. However, in these cases, the responsiveness of specifically affected drives decreases in is comparison to other drives, and so this can be seen as a temporary asymmetry across the drives.

Figure 9:
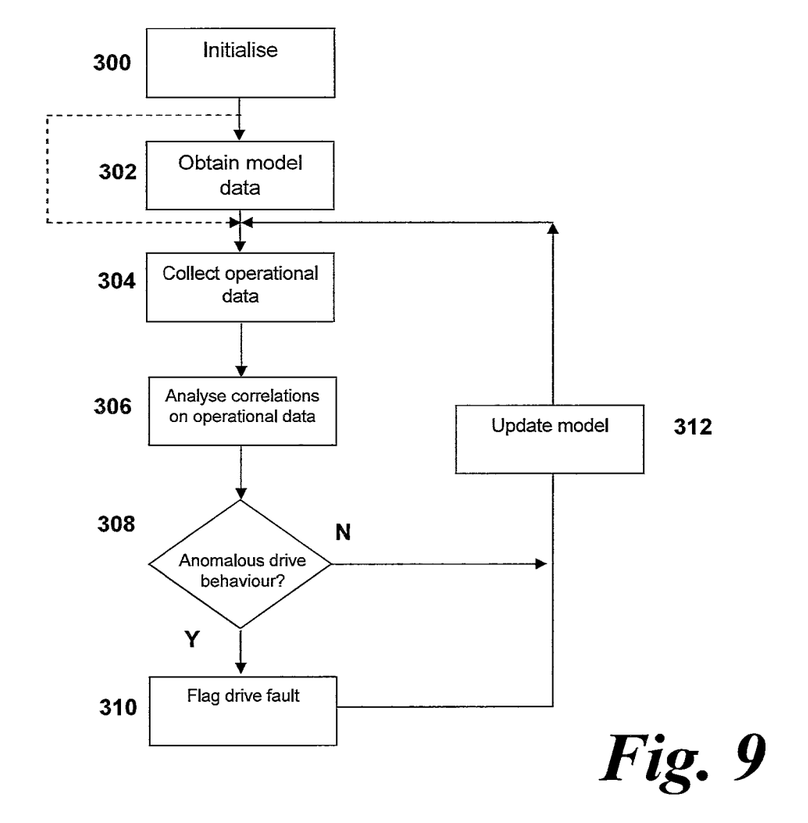
FIG. 9 is a flow diagram showing a method of operation of the present invention.

FIG. 9 shows a flow chart illustrating the steps of the method according to an embodiment of the present invention. FIG. 9 shows a method of utilising the present invention in a networked storage resource such as that shown in FIG. 1 or 2.

Step 300: Initialise Data Collection

At step 300, the data collection and model is initialised. This may be done when the drives are first installed, or on known "healthy" drives. The method proceeds to step 302.

Step 302: Obtain Model Data

Step 302 is optional. If sufficient data exists (i.e. available historical data from previous normal use of the drive in question) then the method may skip to step 304.

If previous operational data on a particular drive 200 is unavailable (e.g. the drive is newly installed), then a computer program is arranged to monitor the normal operation of the relevant drive within a RAID array located on a storage resource or server and to obtain data relating to the multiple parameters as discussed above. Data relating to the throughput (T), queue time $t_q$ and completion time $t_c$ for a substantially fault-free drive 200 is gathered. This data is collected from the device driver of the Linux kernel. This approach enables higher sampling rates for the data collection without putting the load on physical drives.

The computer program uses appropriate algorithms and computation to determine the Poisson distributions and relevant correlations for the drive under fault-free conditions as outlined in the examples above. The analytics package is arranged to interpret the correlations in the system, and is used to build the model using the above parameters and the data retrieved. In other words, the algorithms will prepare a database of normal operating characteristics specific to that individual system.

Alternatively, if it is not possible to carry out such a "training phase", approximate drive characteristics can be obtained from a similar drive already in use or for which a database of characteristics has been obtained. Such a determination may be based on a parse of the drive's characteristics such as manufacturer, size, speed, configuration and hardware. Alternatively, this data could be manually entered and a reference database used to identify the relevant data set for a particular drive. This data can then be refined in later stages if necessary.

The information derived in step 302 can then be stored in a look-up table or similar arrangement and used to compare and monitor the data obtained from the relevant drives 200 in continued use.

In a further alternative, a hybrid of the above cases could be implemented whereby a basic core of characteristics could be modified to relate to specific individual requirements of a particular system.

The method then proceeds to step 304.

Step 304: Collect Operational Data

At step 304, a computer program is arranged to monitor the continued operation of one or more drives within a RAID array located on a storage resource or server and to obtain data relating to the multiple parameters as discussed above. Data relating to the throughput (T), queue time $t_q$ and completion time $t_c$ for a substantially fault-free drive 200 is gathered in this step. This data is collected from the device driver of the Linux kernel. This approach enables higher sampling rates for the data collection without putting the load on physical drives.

The method then proceeds to step 306.

Step 306: Analyse Correlations on Operational Data

At step 306, the computer program uses appropriate algorithms and computation to determine the Poisson distributions and relevant correlations for the drive(s) in question in continued operation. The distribution and correlation of the three parameters discussed above as measured in continued use are calculated and compared to those measured under normal operating conditions.

Changes in correlations and any deviations in, for example, the Skellam distribution between the measured and expected values are determined in this step.

The method proceeds to step 308.

Step 308: Anomalous Drive Behaviour?

At step 308, it is determined whether the analysis performed in step 306 on the data obtained in step 304 is in accordance with nominal hard drive operation or whether the obtained relationships indicate that there may be a hard drive fault or issue. This may be done by identifying a (potentially temporary) anomaly in the correlations between drive parameters and/or a shift in centroid of the Skellam distribution calculated in step 306.

If it is determined that there is no, or little, likelihood of a hard drive problem, the method proceeds to step 312. Alternatively, if it is determined that a problem, or a potential anomaly, may have arisen, the method then proceeds to step 310.

Step 310: Flag Drive Fault

At step 310, the monitoring and analysis program is operable to notify the user that there is anomalous behaviour occurring on the drive which should be investigated further. The user may then run diagnostic processes, or replace the drive if it is underperforming. Alternatively, the drive fault could be flagged and then a repair or restore process could be automatically engaged.

The method then proceeds back to step 304, via step 312 if appropriate, and the steps are repeated in the continuous monitoring process.

Step 312: Update Model

Optionally, the model may be updated with representative values of the above parameters to refine the model of the drive under normal, fault-free operating conditions. If, however, an anomaly or error is detected, this step may be omitted and the method may proceed directly back to step 304.

Variations of the above embodiments will be apparent to the skilled person. The precise configuration of hardware and software components may differ and still fall within the scope of the present invention.

Whilst examples have been given of a RAID array of drives, the present invention is applicable to single drives or any arrangement of parallel drives, for example Hadoop.

Further, whilst examples have been described above using Poisson and Skellam distributions, the skilled person would be readily aware of alternative distributions and correlations which could be used with the present invention. For example, Gaussian distributions having specific parameters could be used.

Whilst the above embodiments have been described with reference to networked systems, resources and servers, other implementations could be used. For example, local RAID arrays or file servers. There is no explicit requirement for a distributed system to be utilised.

Further, the present invention has been described with reference to controllers in hardware. However, the controllers and/or the invention may be implemented in software.

Additionally, whilst the present embodiment relates to arrangements operating predominantly in off-host firmware or software, an on-host arrangement could be used.

The controller or method of the present embodiments may be used to manage a plurality of separate networked storage resources if required.

In addition, whilst a RAID array has been described in embodiments as a storage architecture for use with the present invention, this need not necessarily be the case. Any suitable storage or hard disk protocol may be used with the present invention.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of monitoring the performance of one or more storage devices, each storage device being operable to receive storage requests and comprising a queue for incoming storage requests and a physical storage medium, the method comprising:
   obtaining, on a computing device, device parameters of:
      throughput of storage requests to each storage device; queue time for one or more requests on each storage device; and a time required to complete one or more storage requests on each storage device;
   generating a model relating to an expected distribution of said device parameters on each storage device during normal operation;
   monitoring, on the computing device, said parameters during operation of each storage device;
   comparing, on the computing device, a distribution of said monitored parameters during operation of each storage device with the expected distribution of said parameters; and
   identifying, on the computing device, a fault on at least one of the storage devices based on said comparison.

2. A method according to claim 1, wherein the one or more storage devices are provided in parallel.

3. A method according to claim 2, wherein each storage device forms part of a RAID array.

4. A method according to claim 1 further comprising:
   comparing the distribution of said monitored parameters for one storage device with the distribution of said monitored parameters for at least one other storage device.

5. A method according to claim 1, further comprises:
   determining an expected correlation between the device parameters for each storage device.

6. A method according to claim 5, further comprising:
   comparing the expected correlation between the device parameters for each storage device with a correlation between the monitored parameters for each storage device.

7. A method according to claim 5, wherein said correlation is determined using Bayesian probability analysis.

8. A method according to claim 1, wherein the model is generated using a Poisson distribution of said device parameters.

9. A method according to claim 8, further comprising:
   comparing the Poisson distribution of said monitored parameters during operation of each storage device with an expected Poisson distribution of said device parameters.

10. A method according to claim 9, further comprising:
    determining a Skellam distribution for said expected and monitored parameters.

11. A method according to claim 10, further comprising:
    identifying a fault with the at least one storage device based on said Skellam distribution.

12. A non-transitory computer usable storage medium having a computer program product stored thereon comprising one or more software portions for performing the steps of claim 1.

13. A computing apparatus comprising:
    a processor operable to monitor the performance of one or more storage devices, each storage device being operable to receive storage requests and comprising a queue for incoming storage requests and a physical storage medium, the processor being configured to:
       monitor during operation of each storage device parameters of:
    throughput of storage requests to each storage device; queue time for one or more requests on each storage device; and a time required to complete one or more storage requests on each storage device;
       generate a model relating to an expected distribution of said device parameters on each storage device during normal operation;
       compare a distribution of said monitored parameters during operation of each storage device with the expected distribution of said parameters; and
       identify a fault on at least one of the storage devices based on said comparison.

14. The computing apparatus according to claim 13, wherein the one or more storage devices are provided in parallel.

15. The computing apparatus according to claim 14, wherein each storage device forms part of a RAID array.

16. The computing apparatus according to claim 13, further operable to compare the distribution of said monitored parameters for one storage device with the distribution of said monitored parameters for at least one other storage device.

17. The computing apparatus according to claim 13, further operable to determine an expected correlation between the device parameters for each storage device.

18. The computing apparatus according to claim 17, further operable to compare the expected correlation between the device parameters for each storage device with a correlation between the monitored parameters for each storage device.

19. The computing apparatus according to claim 13, wherein said correlation is determined using Bayesian probability analysis.

20. The computing apparatus according to claim 13, wherein the model is generated using a Poisson distribution of said device parameters.

21. The computing apparatus according to claim 20, further operable to compare the Poisson distribution of said device parameters during operation of each storage device with an expected Poisson distribution of said device parameters.

22. The computing apparatus according to claim 21, further operable to determine a Skellam distribution for said expected and monitored parameters.

23. The computing apparatus according to claim 21, further operable to identify a fault with the at least one storage device based on said Skellam distribution.

24. A storage system comprising at least one data storage resource and the computing apparatus of claim 13.

* * * * *